Feb. 23, 1932. M. J. MITCHELL 1,846,431
GRAIN CONVEYER BELT END CONNECTER
Filed June 22, 1931
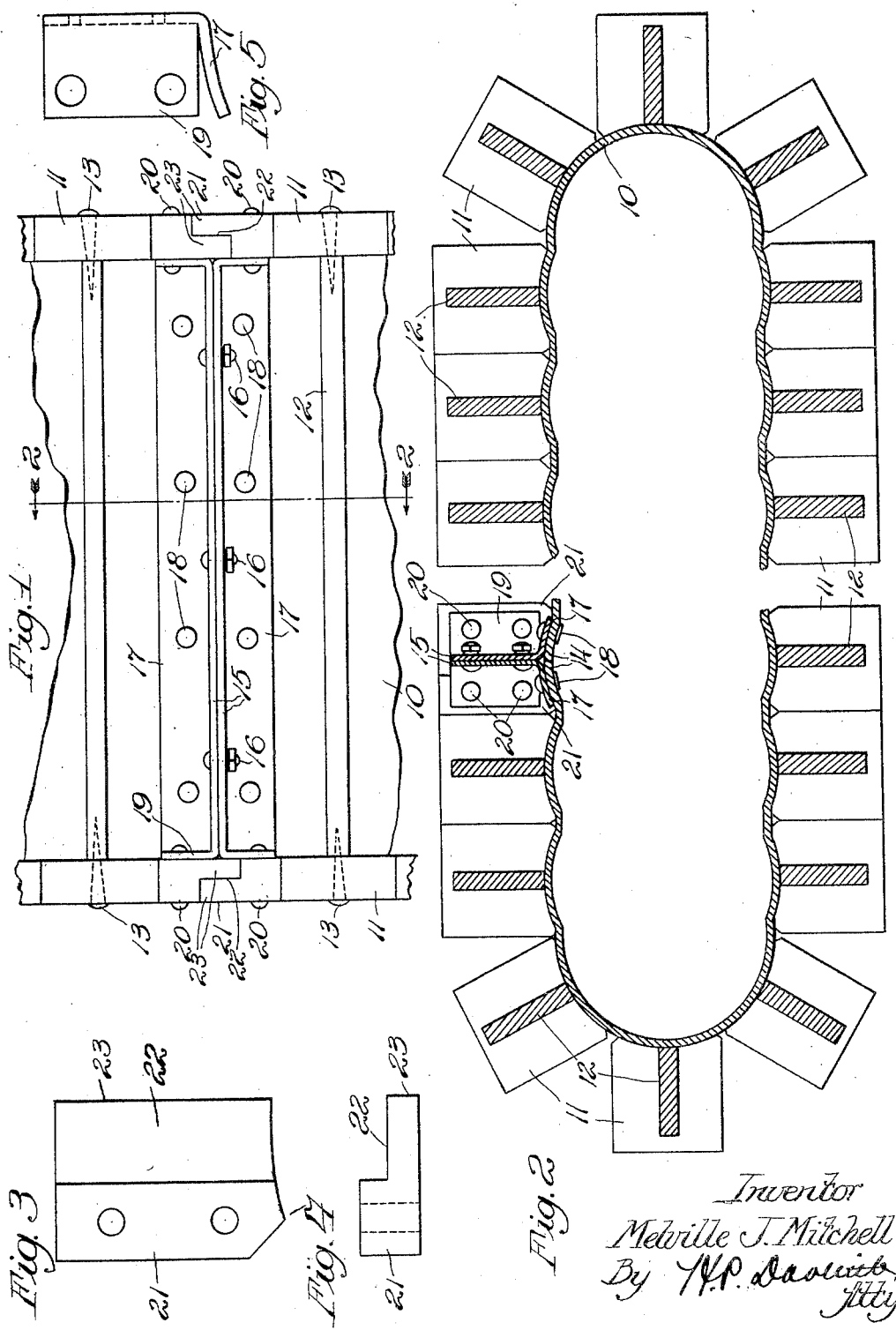
Inventor
Melville J. Mitchell Patented Feb. 23, 1932

1,846,431

UNITED STATES PATENT OFFICE

MELVILLE J. MITCHELL, OF CHICAGO, ILLINOIS, ASSIGNOR TO INTERNATIONAL HARVESTER COMPANY, A CORPORATION OF NEW JERSEY

GRAIN CONVEYER BELT END CONNECTER

Application filed June 22, 1931. Serial No. 545,900.

The invention relates to an improved belt end connecter for endless conveyers of the slatted apron type now commonly employed in harvester threshers for moving threshed grain from underneath the threshing cylinder to elements of the separator.

It has been found that, due to inadequate belt end connections, grain falls between the belt ends, where they are joined, and becomes wasted. Such waste obviously is objectionable.

The primary object of the present invention is to provide an improved belt end connecter for such a conveyer that will prevent passage and loss of grain between the connected ends of the apron conveyer belt.

Such object, along with others that should be apparent to those skilled in this art, is accomplished by the form of belt end joint illustrated in the accompanying sheet of drawings, wherein:

Figure 1 is a plan view of a fragmentary portion of the conveyer belt showing the improved end connecter joint;

Figure 2 is a cross sectional view of the complete endless belt as viewed in the indicated direction along the longitudinal section line 2—2 appearing in Figure 1;

Figures 3 and 4 are, respectively, face and top plan views of the side block splice elements used; and, Figure 5 is an end view of a belt end connecter strap.

The conveyer is of a conventional endless apron type used in conveying threshed grain and comprises a belt portion 10 suitably secured at its edges to a series of wood end blocks 11 at their under sides, said blocks having such under sides slightly arcuated, as shown. The belt along its straight-away run thus appears undulated. Slats 12 are transversely secured across the high portions of the belt, each slat 12 connecting between opposed pairs of blocks 11 by being nailed thereto, as shown at 13. So much of the belt structure described is conventional.

The problem here is to connect adjoining ends 14 of the belt in a manner to prevent grain wastage through the connected belt ends.

Accordingly, two angle iron straps 15 are arranged back to back and secured together by bolts 16 to form a transversely disposed conveyer slat. The lower flange of each angle bar 15, as shown, is arcuated at 17 and riveted at 18 to the belt 10. The ends of each connecter strap 15 are formed with wings 19, each wing being bolted at 20 to two-part end blocks generally numbered 21.

As shown in Figures 3 and 4, each block 21 is made of two parts formed with a mortise 22 and tenon 23 that interfit, as shown, to form a complete end block assembly. Each block part of the assembly is secured to a wing 19, as shown, of the connecter straps 15. It will be noted that these blocks 21 are identical in construction, so that either may be left or right parts, and also that each part has its lower edge arcuated, as shown in Figure 3, to conform to the undulation in the belt. These undulations in the belt offer a good contact surface in breaking around the drive and idler rollers for the belt, which rollers have not been shown.

From this disclosure it can now be seen that an improved belt end connecter has been provided for a belt of the kind stated, which connecter effectively prevents grain wastage.

It is the intention to cover herein all such changes and modifications which do not depart from the spirit and scope of the invention as defined in the appended claims.

What is claimed is:

1. A connecter for the adjacent ends of an endless apron type conveyer belt, said connecter comprising a pair of angle bar straps arranged back to back and secured together to form a transversely disposed conveyer slat, said straps having bottom flanges secured to the respective conveyer ends and angularly bent end wings, a splice block at each lateral edge of the belt disposed off-end relative to the wings, and means securing the adjacent wings and splice blocks.

2. A connecter for the adjacent ends of an endless apron type grain conveyer belt, said connecter comprising a pair of angle bar straps arranged back to back and secured together to form a transversely disposed conveyer slat, said straps having arcuated bottom flanges secured to the respective conveyer ends to form undulations therein, said straps also having angularly bent end wings, a splice block at each lateral edge of the belt disposed off-end relative to the wings, and means securing the splice blocks to an adjacent wing.

3. A connecter for the adjacent ends of an endless apron type grain conveyer belt, said connecter comprising a pair of angle bar straps arranged back to back and secured together to form a transversely disposed conveyer slat, said straps having arcuated bottom flanges secured to the respective conveyer ends to form undulations therein, said straps also having angularly bent end wings, a splice block at each lateral edge of the belt off-end relative to the wings, each said block likewise formed with an arcuated bottom edge, and means securing the adjacent wings and splice blocks.

4. A connecter for the adjacent ends of an endless apron type grain conveyer belt, said connecter comprising a pair of angle bar straps arranged back to back and secured together to form a transversely disposed conveyer slat, said straps having bottom flanges secured to the conveyer ends and angularly bent end wings, a splice block at each lateral edge of the belt off-end relative to the wings, each splice block comprising a mortise and a tenon part fitted together, and means securing said parts of the blocks to adjacent wings of the straps.

5. A connecter for the adjacent ends of an endless apron type grain conveyer belt, said connecter comprising a pair of angle bar straps arranged back to back and secured together to form a transversely disposed conveyer slat, said straps having arcuated bottom flanges secured to the conveyer ends to form undulations therein, said straps also having angularly bent end wings, a splice block having an arcuated bottom edge and disposed at each lateral edge of the belt off-end relative to the wings, each splice block comprising two interfitted parts, and means passed laterally through each block part and the adjacent wing of a strap to secure the blocks to the straps.

6. A connecter for the adjacent ends of an endless apron type grain conveyer belt, said connecter comprising a pair of angle bar straps arranged back to back and secured together to form a transversely disposed conveyer slat, said straps having bottom flanges secured to the conveyer ends and angularly bent end wings, a splice block at each lateral edge of the belt off-end relative to the wings, each splice block comprising two interfitted parts, and means passed laterally through each block part and the adjacent wing of a strap to secure the blocks to the straps.

In testimony whereof I affix my signature.
MELVILLE J. MITCHELL.